US008621232B2

(12) United States Patent
Fries et al.

(10) Patent No.: US 8,621,232 B2
(45) Date of Patent: Dec. 31, 2013

(54) METHOD FOR PRODUCING, ALLOCATING AND CHECKING AUTHORIZATION APPROVALS

(75) Inventors: Steffen Fries, Baldham (DE); Jürgen Gessner, Forstinning (DE)

(73) Assignee: Siemens Aktiengesellschaft, Munich (DE)

( * ) Notice: Subject to any disclaimer, the term of this patent is extended or adjusted under 35 U.S.C. 154(b) by 266 days.

(21) Appl. No.: 12/996,813

(22) PCT Filed: May 6, 2009

(86) PCT No.: PCT/EP2009/055447
§ 371 (c)(1),
(2), (4) Date: Dec. 8, 2010

(87) PCT Pub. No.: WO2009/149994
PCT Pub. Date: Dec. 17, 2009

(65) Prior Publication Data
US 2011/0087891 A1 Apr. 14, 2011

(30) Foreign Application Priority Data
Jun. 10, 2008 (DE) ......................... 10 2008 027 586

(51) Int. Cl.
*G06F 7/04* (2006.01)
*G06F 21/00* (2013.01)

(52) U.S. Cl.
USPC ............................................ 713/185; 726/27

(58) Field of Classification Search
None
See application file for complete search history.

(56) References Cited

U.S. PATENT DOCUMENTS

| | | | | |
|---|---|---|---|---|
| 6,557,105 B1 * | 4/2003 | Tardo et al. | ................... | 713/193 |
| 7,127,611 B2 * | 10/2006 | Dabbish et al. | ............... | 713/168 |
| 7,196,610 B2 | 3/2007 | Straumann et al. | .......... | 340/5.61 |
| 2003/0061492 A1 | 3/2003 | Rutz et al. | ..................... | 731/182 |
| 2004/0186880 A1 * | 9/2004 | Yamamoto et al. | ........... | 709/200 |
| 2006/0248345 A1 | 11/2006 | Ishidera | ........................ | 713/183 |

FOREIGN PATENT DOCUMENTS

| | | | |
|---|---|---|---|
| DE | 10056135 A1 | 5/2002 | ............. G06F 21/00 |
| DE | 102005015792 | 12/2005 | .............. G06F 12/14 |
| EP | 1336937 | 8/2003 | ............... G07C 9/00 |
| EP | 1582950 | 10/2005 | ........... G05B 19/406 |

OTHER PUBLICATIONS

Schneier, Bruce: "Angewandte Kryptographie", Addison Wesley Publishing Company; pp. 219-221, 1996.
Wolfgang Rankl, et al.; "Handbuch der Chipkarten, Aufbau—Funktionsweise—Einsatz von Smart Cards", Auflage; pp. 201-203, 425-426, 1999.
International Search Report and Written Opinion for Application No. PCT/EP2009/055447 (12 pages), Jul. 28, 2009.

* cited by examiner

*Primary Examiner* — Kaveh Abrishamkar
(74) *Attorney, Agent, or Firm* — King & Spalding L.L.P.

(57) ABSTRACT

In a method for producing, allocating and checking authorization approvals that are required in order to fulfill tasks specified by an action plan through performance, by a service technician, of actions defined by the tasks on a device or component of a distributed structure on-the-fly generation and distribution of authorization approvals for service technicians is enabled as a function of necessary actions or measures which are to be performed in the form of tasks and are defined as part of an action plan which is contained or recorded in a work schedule.

18 Claims, 1 Drawing Sheet

METHOD FOR PRODUCING, ALLOCATING AND CHECKING AUTHORIZATION APPROVALS

CROSS-REFERENCE TO RELATED APPLICATIONS

This application is a U.S. National Stage Application of International Application No. PCT/EP2009/055447 filed May 6, 2009, which designates the United States of America, and claims priority to DE Application No. 10 2008 027 586.7 filed Jun. 10, 2008. The contents of which are hereby incorporated by reference in their entirety.

TECHNICAL FIELD

The invention relates to a method for producing, allocating and checking authorization approvals.

BACKGROUND

The installation or commissioning or, as the case may be, the operation of a device or a component in a distributed structure such as a network, e.g. a power distribution network, generally necessitates an authentication of a user using or accessing the device or component, typically a service technician. For this purpose use is often made of authorization schemes which ensure or are intended to ensure that a service technician acting in an administrator role is not only authenticated, but in addition is also authorized to perform specific actions or initiate specific measures.

In prior art approaches an authorization is performed either at local level or using special online authentication services such as Kerberos, for example.

In Kerberos, a user wanting to use a service that requires authorization requests a Kerberos server to issue a ticket which is then presented to the service. In return, the service checks the ticket and grants access to the service. With Kerberos there are accordingly three parties involved: a client, a server providing a service that the client wishes to use, and a Kerberos server. The Kerberos service authenticates both the server to the client and the client to the server. Furthermore, the Kerberos server itself also authenticates itself to the client and server and itself verifies their identity. Kerberos also uses approvals, referred to as tickets or grants, for authentication purposes. In order to be able to use the Kerberos service a client must first log on to the Kerberos server. The client requests a so-called Ticket Granting Ticket (TGT) from the Kerberos server. To that end the user of the client must either enter a password, authenticate him-/herself by means of a certificate and associated private key or the TGT is requested directly at the time of user login. With the TGT, the client is able to request further tickets for services without having to authenticate itself again. A so-called session key is also negotiated for the purpose of communication between client and Kerberos server. This key can be used for encrypting the data traffic. In order to be able to use a service supported by Kerberos, the client requests a further ticket. The client then sends said ticket to the service, which checks whether it should grant the client access. In this case too a session key is agreed and the identity of client, server and Kerberos server verified.

A disadvantageous aspect of this arrangement is that Kerberos can only be used in online scenarios.

The following exemplary scenario, which relates to a preferably local administration of a transformer substation control device and its associated outdoor or field equipment in a power distribution network, illustrates the problems resulting herefrom.

In order to perform certain administrative tasks relating, for example, to specific actions such as, say, switchover measures, an authorization of the service technician is required. Depending on the online status of the control device that is to be administered it is possible that the device that is to be administered or the component that is to be switched over is not able to obtain authorization information from a control center or command station or to request said information from such a control entity.

For such cases the service technician should be able to present or provide an authorization approval, even if the transformer substation is offline. Consequently the service technician is recommended to carry the authorization approval along with him, although it must also be possible for the approval to be withdrawn within twenty-four hours.

SUMMARY

According to various embodiments, a method for producing, allocating and checking authorization approvals can be provided which are required in order for a service technician to fulfill tasks specified by an action plan by performing actions defined by the tasks on a device or component of a distributed structure.

According to an embodiment, a method for producing, allocating and checking authorization approvals that are required in order to fulfill tasks specified by an action plan through performance, by a service technician, of actions on a device or component of a distributed structure, may comprise: —generating at least one authorization approval that is bound to an identity certificate of the service technician which is stored on a storage medium carried or able to be carried by the service technician and has a limited period of validity and that is required for fulfilling at least one task specified by the action plan; —signing the authorization approval with a non-public key; —storing the signed authorization approval on a storage medium carried or able to be carried by the service technician; —making at least the identity certificate and the signed authorization approval available to the device or component by the service technician; —checking the period of validity of the identity certificate by the device or component; —checking the signature of the signed authorization approval by the device or component with the aid of a public key associated with the non-public key used for generating the signature as well as a main certificate of a certification authority that issued the public key; —wherein both the public key and the main certificate of the certification authority are available or are made available to the device or component; —checking the authorization approval by the device or component; and —if the result of all the checks confirms the identity of the service technician and allows the tasks to be fulfilled, granting of the permission to the service technician by the device or component to carry out the actions requiring to be performed in order to fulfill the tasks set or specified by the action plan.

According to a further embodiment, the signed authorization approval can be stored on the same storage medium carried or able to be carried by the service technician as the identity certificate having a limited period of validity. According to a further embodiment, the signed authorization approval can be requested online and cryptographically linked with the identity certificate having a limited period of validity. According to a further embodiment, both the public key and the main certificate of the certification authority can be stored in a database integrated in the device or component or in a memory integrated in the device or component. According to a further embodiment, both the public key and the main certificate of the certification authority can be made available to the device or component by the service technician. According to a further embodiment, both the public key and the main certificate of the certification authority can be made available to the device or component by the service technician by virtue of the fact that said key and certificate are also stored on the same storage medium carried or able to be carried by the service technician as the identity certificate having a limited period of validity. According to a further embodiment, the device or component may request both the public key and the main certificate of the certification authority online. According to a further embodiment, the storage medium carried or able to be carried by the service technician can be a smartcard or a Universal Serial Bus (USB) stick. According to a further embodiment, the non-public key used for signing the authorization approval can be the non-public key of a service center producing the action plan. According to a further embodiment, the identity certificate of the service technician may have a period of validity limited to two years. According to a further embodiment, the authorization approval may have a period of validity of no more than 24 hours.

BRIEF DESCRIPTION OF THE DRAWINGS

The invention is explained in more detail below with reference to the single drawing FIG. 1, in which.

DETAILED DESCRIPTION

Figure 1:
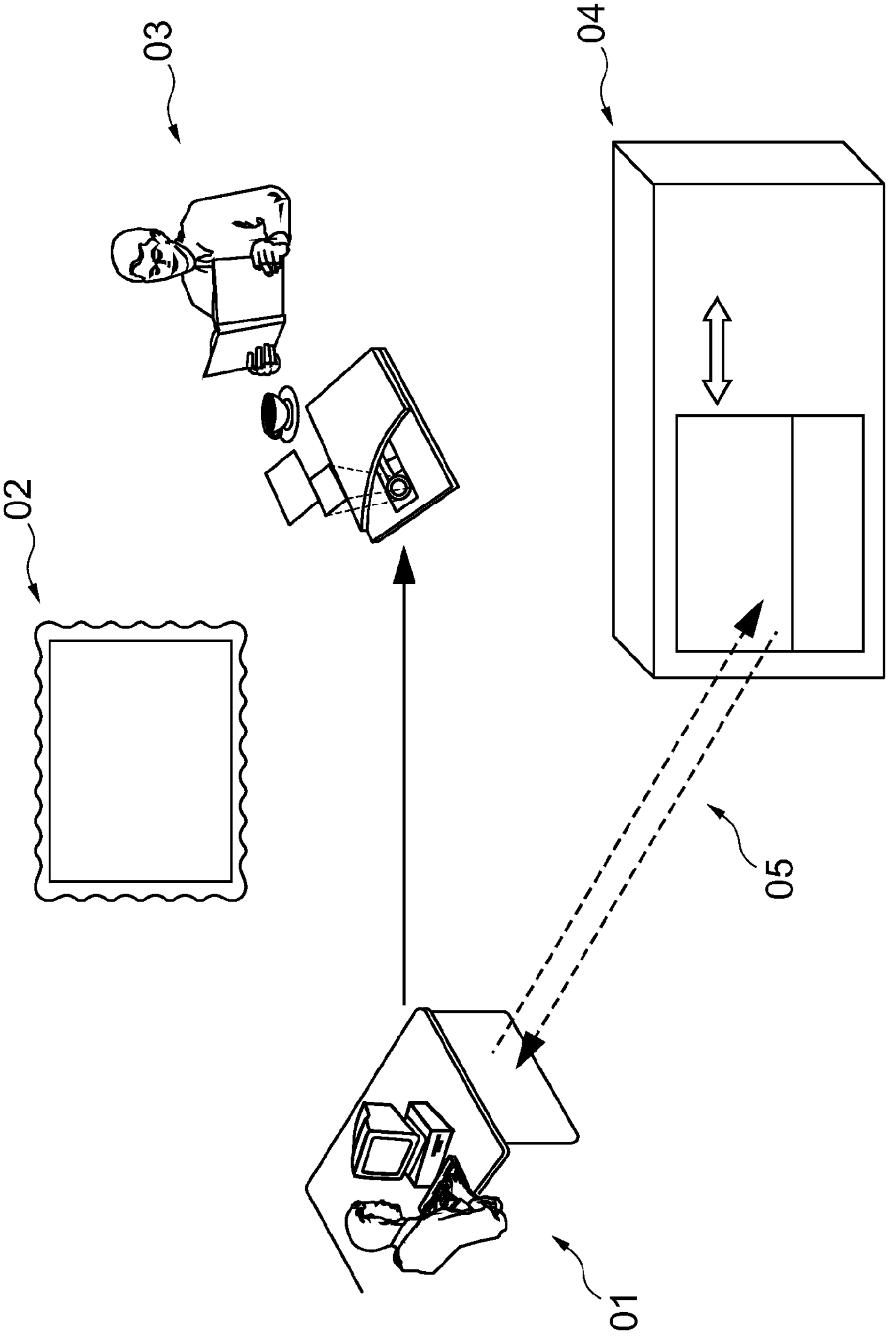
FIG. 1 shows in a schematic representation a workflow sequence of a method.

Accordingly, for the purpose of producing, allocating and checking authorization approvals which are required in order for a service technician to fulfill tasks specified by an action plan by performing actions defined by the tasks on a device or component of a distributed structure, a method according to various embodiments provides the following method steps of:

- generating at least one authorization approval that is bound to an identity certificate of the service technician which is stored on a storage medium carried or able to be carried by the service technician and has a limited period of validity and that is required for fulfilling at least one task specified by the action plan;
- signing the authorization approval with a private or non-public key or non-public certificate;
- storing the signed authorization approval on a storage medium carried or able to be carried by the service technician;
- making at least the identity certificate and the signed authorization approval available to the device or component by the service technician;
- checking the period of validity of the identity certificate by the device or component;
- checking the signature of the signed authorization approval by the device or component with the aid of a public key or public certificate associated with the non-public key or non-public certificate used for generating the signature as well as a main certificate (signature key certificate) of a certification authority that issued the public key or public certificate;
- wherein both the public key or public certificate and the main certificate of the certification authority are available or are made available to the device or component;
- checking the authorization approval by the device or component; and
- if the result of all the checks confirms the identity of the service technician and allows the tasks to be fulfilled, granting of the permission to the service technician by the device or component to carry out the actions requiring to be performed in order to fulfill the tasks set or specified by the action plan.

The various embodiments allow on-the-fly generation and distribution of authorization approvals for service technicians as a function of requisite actions which are to be performed or measures which are to be taken and which are defined in the form of tasks as part of an action plan contained or recorded in a work schedule.

By means of the method according to various embodiments the component or device that is to be administered is able to verify an authorization approval either offline or online.

An embodiment provides that the signed authorization approval shall be stored on the same storage medium carried or able to be carried by the service technician as the identity certificate having a limited period of validity.

A further embodiment provides that the signed authorization approval can be requested online and is cryptographically connected to the identity certificate having a limited period of validity. By virtue of the cryptographic connection the signed authorization approval is bound to the identity certificate, thereby precluding misuse, or, alternatively, the signed authorization approval can only be used in conjunction with the assigned identity certificate.

Both the public key or public certificate and the main certificate of the certification authority can be stored in a database integrated in the device or component or in a memory integrated in the device or component.

Equally, both the public key or public certificate and the main certificate of the certification authority can be made available to the device or component by the service technician.

It is conceivable in this case that both the public key or public certificate and the main certificate of the certification authority are made available to the device or component by the service technician by virtue of the fact that these are likewise stored on the same storage medium carried or able to be carried by the service technician as the identity certificate having a limited period of validity.

Another embodiment provides that the device or component shall request the public key or public certificate as well as the main certificate of the certification authority online.

The storage medium carried or able to be carried by the service technician is preferably a smartcard or a Universal Serial Bus (USB) stick.

An additional embodiment provides that the non-public key used for signing the authorization approval be the non-public key of a service center producing the action plan.

An embodiment provides that the identity certificate of the service technician have a period of validity that is preferably limited to two years.

A further embodiment provides that the authorization approval shall have a period of validity of no more than 24 hours in order to fulfill the requirement of denying access after one day has elapsed. The method according to various embodiments allows temporary authorization approvals to be issued for the purpose of fulfilling specific assigned tasks which can be generated with the aid of a planning utility routine producing the action plan. Authorization approvals having only a short validity can be produced through the immediate linking of action plan, tasks defined therein, actions to be performed or measures to be taken that are specified by the tasks, and the identity of the service technician named in the action plan, as well as by the immediate proximity in time resulting therefrom from the production of the action plan to the execution of the action plan by a service technician, thereby ensuring that authorization measures can be revoked within a very short time, without revoking an identity certificate to which the authorization approvals are linked.

In a first method step 01, a service center generates an authentication approval as a function of an action plan associated with a specific service technician or a list of authentication approvals that are necessary in order to be able to perform specific e.g. administrative actions for the purpose of fulfilling specific tasks set or specified by the action plan on a component that is to be administered. In this case the authorization approval or the list of authorization approvals is signed with a private or non-public key of the service center, for example.

In a second method step 02, the authorization approval or the list of authorization approvals is stored on a smartcard. Preferably also stored or loaded on the smartcard is an identity certificate of the service technician that is limited to a period of validity of preferably two years maximum or that is to be renewed e.g. every two years.

In a third method step 03, the service technician makes available to the component that is to be administered his credentials, which are preferably all stored on the same smartcard. These credentials are at least his identity certificate and the authentication approval or the list of authentication approvals.

In a fourth method step 04, the component that is to be administered first checks the identity certificate of the service technician by checking the period of validity of the identity certificate and by checking the signature of the service center that was generated with the private or non-public key with the aid of a public key or public certificate of the service center that was issued by a certification authority and a main certificate of the certification authority that issued the public key or public certificate of the service center. Both the public key or public certificate of the service center and the main certificate of the certification authority are available or are made available to the component that is to be administered. In this case it is conceivable on the one hand that said certificates are stored in a database integrated in the component or in a memory integrated in the component, or are also made available by the service technician, for example in that they are likewise stored on the service technician's smartcard. It is also conceivable that in a further method step 05 the component requests the certificates online from the service center, for example.

In the fourth method step 04, the component that is to be administered also checks the authorization approval or the list of authorization approvals before it subsequently permits the service technician to carry out the actions that are to be performed in order to fulfill the specific tasks set or specified by the action plan.

As already indicated it is conceivable, in a fifth method step 05, also to check the authorization approval or the list of authorization approvals online with the service center, for example.

A further exemplary embodiment of the method relates to support for authorizations in on-call emergency service situations. With the planning of on-call emergency service times of service technicians an on-call authorization approval can be generated and output to a service technician concerned. In this case the period of validity of the on-call authorization approval corresponds to the on-call emergency service time of the service technician. Said on-call authorization approval can now be used either directly in order to access a component or it can be used to generate an authorization approval for a component experiencing an emergency situation. Owing to the short period of validity of the approvals it is not necessary to revoke or cancel the approval.

The method according to various embodiments allows temporary authorization approvals to be issued for the purpose of fulfilling specific assigned tasks that can be produced with the aid of a planning utility routine.

Authorization approvals having only a short period of validity can be generated through the direct linking of action plan, tasks defined therein, actions to be performed or measures to be taken that have been specified by the tasks, and the identity of the service technician named in the action plan, as well as through the immediate proximity in time resulting therefrom from the production of the action plan to the execution of the action plan by a service technician, thereby ensuring that authorization measures can be revoked within a very short time without revoking an identity certificate to which the authorization approvals are linked.

The various embodiments use the schemes known e.g. from Kerberos and applies these to the production, allocation and checking or, as the case may be, issuing, distribution and use of authorization approvals, such as e.g. confirmation certificates, referred to as attribute certificates, or security tokens known as Security Assertion Markup Language (SAML) assertions. Qualification or attribute certificates and SAML assertions are mentioned explicitly in this context since these have or provide features which can also be used in offline scenarios.

Since both schemes use or provide digital signatures, it is provided according to various embodiments that the component that is to be administered shall possess suitable information of a main certification authority in order to validate a signature contained in an authorization approval.

From the perspective of the workflow it is provided according to various embodiments that a service technician shall first receive a work schedule on which specific administrative tasks to be fulfilled by actions to be performed are specified by a service center. In addition to the specific tasks a planning utility routine generating the workflow also generates authorization approvals that are associated with a specific service technician.

Preferably each service technician additionally possesses credentials or a proof of authorization, also referred to as an identity certificate, for the purpose of proving his identity.

For that purpose identity certificates are issued preferably with a period of validity of two years.

The authorization approval is preferably bound to the identity certificate of the service technician and has a validity of preferably no more than 24 hours in order to fulfill the requirement of denying access after one day has elapsed.

The authorization approval is signed or, as the case may be, encrypted with the aid of a private or non-public key of the service center.

A public key or public certificate of the service center is issued by a certification authority (CA).

A main certificate of said certification authority is available to the components that are to be administered or is made available to said components.

The service center transfers the authorization to the service technician e.g. by suitable means, such as, say, by email, on a smartcard, Universal Serial Bus (USB) stick or the like.

Preferably the authorization approval is stored or loaded together with the identity certificate on the same medium, preferably on the medium on which the identity certificate of the service technician is already stored or loaded, which means that only one memory is required for storing the certificates and approvals.

In this case the memory can be, for example, a smartcard or an encrypted USB stick or another suitable medium which protects the stored information.

Furthermore, the public key or public certificate of the service center can also be stored on said medium, for example if said key or certificate is not available in the component that is to be administered.

Following successful authentication the service technician can then access the component that is to be administered. In return the component that is to be administered first checks the identity certificate of the service technician by verifying the period of validity of the identity certificate and by checking the signature of the service center generated with the private or non-public key with the aid of the public key or public certificate of the service center and the main certificate of the issuing certification authority. The component that is to be administered then checks the authorization approval before subsequently permitting the service technician to carry out the actions that are to be performed in order to fulfill the specific tasks.

What is claimed is:

1. A method for producing, allocating and checking authorization approvals that are required in order to fulfill tasks specified by an action plan through performance, by a service technician, of actions on a device or component of a distributed structure, comprising:

generating at least one authorization approval having a limited period of validity that is bound to an identity certificate of the service technician which is stored on a storage medium carried or able to be carried by the service technician and that is required for fulfilling at least one task specified by the action plan;

signing the authorization approval with a non-public key;

wherein the non-public key comprises a non-public key associated with a service center producing the action plan;

storing the signed authorization approval on a storage medium carried or able to be carried by the service technician;

making at least the identity certificate and the signed authorization approval available to the device or component by the service technician;

checking the period of validity of the identity certificate by the device or component;

checking the signature of the signed authorization approval by the device or component with the aid of a public key associated with the non-public key used for generating the signature as well as a main certificate of a certification authority that issued the public key;

wherein both the public key and the main certificate of the certification authority are available or are made available to the device or component;

checking the authorization approval by the device or component, including checking the period of validity of the authorization approval; and if the result of all the checks confirms the identity of the service technician and allows the tasks to be fulfilled, granting of the permission to the service technician by the device or component to carry out the actions requiring to be performed in order to fulfill the tasks set or specified by the action plan.

2. The method according to claim 1, wherein the signed authorization approval is stored on the same storage medium carried or able to be carried by the service technician as the identity certificate having a limited period of validity.

3. The method according to claim 1, wherein the signed authorization approval is requested online and cryptographically linked with the identity certificate having a limited period of validity.

4. The method according to claim 1, wherein both the public key and the main certificate of the certification authority are stored in a database integrated in the device or component or in a memory integrated in the device or component.

5. The method according to claim 1, wherein both the public key and the main certificate of the certification authority are made available to the device or component by the service technician.

6. The method according to claim 5, wherein both the public key and the main certificate of the certification authority are made available to the device or component by the service technician by virtue of the fact that said key and certificate are also stored on the same storage medium carried or able to be carried by the service technician as the identity certificate having a limited period of validity.

7. The method according to claim 1, wherein the device or component requests both the public key and the main certificate of the certification authority online.

8. The method according to claim 1, wherein the storage medium carried or able to be carried by the service technician is a smartcard or a Universal Serial Bus (USB) stick.

9. The method according to claim 1, wherein the identity certificate of the service technician has a period of validity limited to two years.

10. The method according to claim 1, wherein the authorization approval has a period of validity of no more than 24 hours.

11. A system comprising a device or component, a storage medium, and a service center for producing, allocating and checking authorization approvals that are required in order to fulfill tasks specified by an action plan through performance, by a service technician, of actions on the device or component of a distributed structure, wherein:

the service center is operable to generate at least one authorization approval having a limited period of validity that is bound to an identity certificate of the service technician which is stored on a storage medium carried or able to be carried by the service technician and that is required for fulfilling at least one task specified by the action plan;

the service center is further operable to sign the authorization approval with a non-public key;

wherein the non-public key used for signing the authorization approval comprises the non-public key of the service center;

the service center is further operable to store the signed authorization approval on the storage medium carried or able to be carried by the service technician;

at least the identity certificate and the signed authorization approval is made available to the device or component by the service technician;

the device or component is operable to check the period of validity of the identity certificate;

the device or component is further operable to check the signature of the signed authorization approval with the aid of a public key associated with the non-public key used for generating the signature as well as a main certificate of a certification authority that issued the public key;

both the public key and the main certificate of the certification authority are available or are made available to the device or component;

the device or component is further operable to check the authorization approval, including checking the period of validity of the authorization approval; and if the result of all the checks confirms the identity of the service technician and allows the tasks to be fulfilled, the device or component is further operable to grant permission to the service technician to carry out the actions requiring to be performed in order to fulfill the tasks set or specified by the action plan.

12. The system according to claim 11, wherein the signed authorization approval is stored on the same storage medium carried or able to be carried by the service technician as the identity certificate having a limited period of validity.

13. The system according to claim 11, wherein the signed authorization approval is requested online and cryptographically linked with the identity certificate having a limited period of validity.

14. The system according to claim 11, wherein both the public key and the main certificate of the certification authority are stored in a database integrated in the device or component or in a memory integrated in the device or component.

15. The system according to claim 11, wherein both the public key and the main certificate of the certification authority are made available to the device or component by the service technician.

16. The system according to claim 15, wherein both the public key and the main certificate of the certification authority are made available to the device or component by the service technician by virtue of the fact that said key and certificate are also stored on the same storage medium carried or able to be carried by the service technician as the identity certificate having a limited period of validity.

17. The system according to claim 11, wherein the device or component requests both the public key and the main certificate of the certification authority online.

18. The system according to claim 11, wherein the storage medium carried or able to be carried by the service technician is a smartcard or a Universal Serial Bus (USB) stick.

* * * * *